US008995240B1

(12) United States Patent
Erven et al.

(10) Patent No.: US 8,995,240 B1
(45) Date of Patent: Mar. 31, 2015

(54) PLAYBACK USING POSITIONING INFORMATION

(71) Applicant: Sonos, Inc., Santa Barbara, CA (US)

(72) Inventors: Niels Van Erven, Santa Barbara, CA (US); Richard Little, Santa Barbara, CA (US); Matthew Nelson, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 14/338,069

(22) Filed: Jul. 22, 2014

(51) Int. Cl.
*G11B 21/08* (2006.01)
*H04B 1/20* (2006.01)

(52) U.S. Cl.
USPC ............... 369/30.27; 369/2; 700/94; 381/103

(58) Field of Classification Search
CPC ... H04M 1/6033; H04R 27/00; H04N 21/242; H04N 21/6332; H04N 21/6547; H04N 21/4307; H04J 3/0664; G06F 17/30749; G06F 17/30775; H04B 1/1661
USPC ............ 369/30.27, 2, 4, 5; 707/722; 713/500, 713/503; 455/344, 3.02, 3.06, 11.1; 381/10, 381/11, 12, 77, 103, 391; 379/406.3; 700/94; 715/716; 370/503, 465; 709/213, 231, 204, 220
See application file for complete search history.

(56) References Cited

U.S. PATENT DOCUMENTS

| 4,696,037 A | 9/1987 | Fierens |
| 5,553,147 A | 9/1996 | Pineau |
| 5,923,902 A | 7/1999 | Inagaki |
| 6,256,554 B1 | 7/2001 | DiLorenzo |
| 6,404,811 B1 | 6/2002 | Cvetko et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,809,635 B1 | 10/2004 | Kaaresoja |

(Continued)

FOREIGN PATENT DOCUMENTS

WO                 0153994         7/2001

OTHER PUBLICATIONS

Voyetra Turtle Beach, Inc., "AudioTron Quick Start Guide, Version 1.0", Mar. 2001, 24 pages.

(Continued)

*Primary Examiner* — Ali Neyzari
(74) *Attorney, Agent, or Firm* — Hanley, Flight and Zimmerman, LLC

(57) ABSTRACT

Systems and methods to determine a position of a base with respect to a playback device and evaluating whether the position is proper or improper given an orientation of the playback device are disclosed and described herein. In one aspect, a playback device is provided. The example playback device includes a first fastener located on a first side of the playback device, a processor, and memory having stored thereon instructions executable by the processor to cause the computing device to perform functions. The functions include determining that a base is not coupled to the playback device via the first fastener and, in response to determining that the base is not coupled to the playback device via the first fastener, adjusting a playback setting of the playback device. The functions further include facilitating output of content via the playback device according to the adjusted playback setting.

20 Claims, 12 Drawing Sheets

(56) References Cited

U.S. PATENT DOCUMENTS

| | | | |
|---|---|---|---|
| 6,882,335 B2 | 4/2005 | Saarinen | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,571,014 B1 | 8/2009 | Lambourne et al. | |
| 7,643,894 B2 | 1/2010 | Braithwaite et al. | |
| 7,657,910 B1 | 2/2010 | McAulay et al. | |
| 7,724,892 B2 * | 5/2010 | Dedieu et al. | 379/406.03 |
| 7,742,740 B2 * | 6/2010 | Goldberg et al. | 455/11.1 |
| 7,889,871 B2 * | 2/2011 | Gierl et al. | 381/10 |
| 8,014,423 B2 | 9/2011 | Thaler et al. | |
| 8,045,952 B2 | 10/2011 | Qureshey et al. | |
| 8,234,395 B2 * | 7/2012 | Millington | 709/231 |
| 8,423,659 B2 * | 4/2013 | Millington | 709/231 |
| 8,689,036 B2 * | 4/2014 | Millington et al. | 713/500 |
| 8,775,546 B2 * | 7/2014 | Millington | 709/213 |
| 2001/0042107 A1 | 11/2001 | Palm | |
| 2002/0022453 A1 | 2/2002 | Balog | |
| 2002/0026442 A1 | 2/2002 | Lipscomb | |
| 2002/0124097 A1 | 9/2002 | Isely et al. | |
| 2003/0157951 A1 | 8/2003 | Hasty, Jr. | |
| 2004/0024478 A1 | 2/2004 | Hans | |
| 2005/0201549 A1 | 9/2005 | Dedieu et al. | |
| 2007/0003067 A1 | 1/2007 | Gierl et al. | |
| 2007/0142944 A1 | 6/2007 | Goldberg et al. | |
| 2007/0265031 A1 | 11/2007 | Koizumi et al. | |
| 2008/0144864 A1 | 6/2008 | Huon | |
| 2008/0146289 A1 | 6/2008 | Korneluk et al. | |
| 2011/0002487 A1 | 1/2011 | Panther et al. | |
| 2012/0051567 A1 | 3/2012 | Castor-Perry | |
| 2013/0022221 A1 | 1/2013 | Kallai et al. | |
| 2013/0129122 A1 | 5/2013 | Johnson et al. | |

OTHER PUBLICATIONS

Voyetra Turtle Beach, Inc.,"AudioTron Reference Manual, Version 3.0", May 2002, 70 pages.

Voyetra Turtle Beach, Inc.,"AudioTron Setup Guide, Version 3.0", May 2002, 38 pages.

Horwitz Jeremy, "Logic3 i-Station25," retrieved from the internet: http://www.ilounge.com/index.php/reviews/entry/logic3-i-station25/, last visited Dec. 17, 2013, 5 pages.

International Bureau, "International Preliminary Search Report", issued in connection with PCT Application No. PCT/US2012/045894, mailed Jan. 30, 2014, 6 pages.

International Bureau, "Search Report", issued in connection with PCT Application No. PCT/US2012/045894, mailed on Dec. 26, 2012, 3 pages.

Jo J., et al., "Synchronized One-to-many Media Streaming with Adaptive Playout Control," Proceedings of SPIE, 2002, vol. 4861, pp. 71-82.

Roland Corporation, "Roland announces BA-55 Portable PA System," press release, Apr. 6, 2011, 2 pages.

UPnP; "Universal Plug and Play Device Architecture"; Jun. 8, 2000; version 1.0; Microsoft Corporation; pp. 1-54.

International Bureau,"Written Opinion", issued in connection with PCT Application No. PCT/US2012/045894, mailed on Dec. 26, 2012, 4 pages.

Bluetooth, "Specification of the Bluetooth System: The ad hoc Scatternet for affordable and highly functional wireless connectivity" Core, Version 1.0 A, Jul. 26, 1999, 1068 pages.(Document uploaded in 7 different files: NPL1_part1 pp. 1 to 150, NPL1_part2 pp. 151 to 300, NPL1_part3 pp. 301 to 450, NPL1_part4 pp. 451 to 600,NPL1_part5 pp. 601 to 750, NPL1_part6 pp. 751 to 900 and NPL1_part7 pp. 901 to 1068).

Bluetooth. "Specification of the Bluetooth System: Wireless connections made easy" Core, Version 1.0 B, Dec. 1, 1999, 1081 pages. (Document uploaded in 8 different files: NPL2_part1 pp. 1 to 150, NPL2_part2 pp. 151 to 303, NPL2_part3 pp. 304 to 453, NPL2_part4 pp. 454 to 603,NPL2_part5 pp. 604 to 703, NPL2_part6 pp. 704 to 854 and NPL2_part7 pp. 855 to 1005, NPL2_part8 pp. 1006 to 1081).

Dell, Inc., "Dell Digital Audio Receiver: Reference Guide", Jun. 2000, 70 pages.

Dell, Inc., "Start Here", Jun. 2000, 2 pages.

Jones, Stephen, "Dell Digital Audio Receiver: Digital upgrade for your analog stereo" Analog Stereo, Jun. 24, 2000 < http://www.reviewsonline.com/articles/961906864.htm> retrieved Jun. 18, 2014, 2 pages.

Louderback, Jim, "Affordable Audio Receiver Furnishes Homes With MP3",TechTV Vault, Jun. 28, 2000 <http://www.g4tv.com/articles/17923/affordable-audio-receiver-furnishes-homes-with-mp3/> retrieved Jul. 10, 2014, 2 pages.

Palm, Inc., "Handbook for the Palm VII Handheld", May 2000, 311 pages.

Higgins et al., "Presentations at WinHEC 2000" May 2000, 138 pages.

* cited by examiner

PLAYBACK USING POSITIONING INFORMATION

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
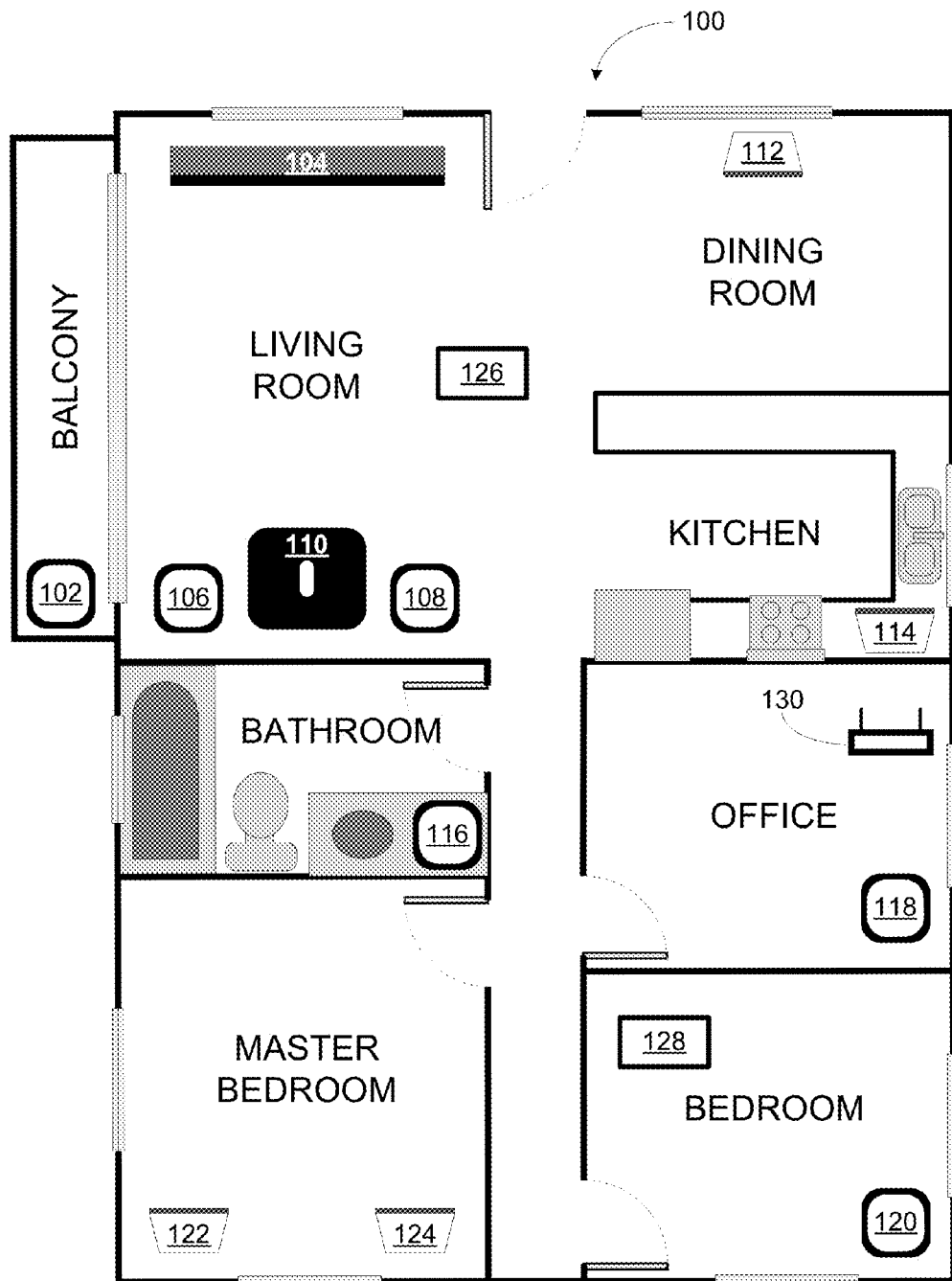
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein relate to a playback device capable of positioning and playback in a variety of orientations and/or positions. For example, the playback device shapes sound and/or adjusts one or more playback settings responsive to its orientation and/or position with respect to another object, a surface, etc. According to some examples, such embodiments may be implemented in an environment and system for which an ability to change an orientation of a playback device, position the playback device with respect to a base, and affect one or more playback settings of the playback device based on that orientation and/or position is desired.

Further, some embodiments described herein help account for movement of a playback device based on vibration induced during playback. Such vibration can, if unimpeded, result in the playback device changing position, tipping, and/or falling over. Traditionally, such vibration-induced movement is reduced by designing a speaker shape to be balanced and/or by adding rubber feet to the device. However, some examples described herein help maintain sound quality and help impede unintended movement of the playback device without using rubber feet and without compromising the aesthetic appearance of the playback device. Some examples provide a playback device positionable with respect to a base (e.g., a foot, pedestal, mount, etc.). The base supports the playback device and helps trigger the playback device to shape sound produced by the playback device based on an orientation and/or position of the playback device with respect to the base.

It will be understood by one of ordinary skill in the art that this disclosure includes numerous other embodiments. While some examples described herein may refer to functions performed by one or more given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
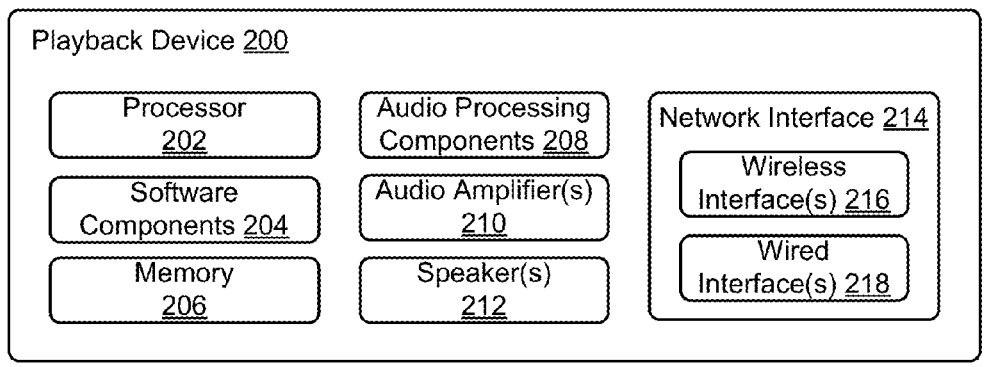
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
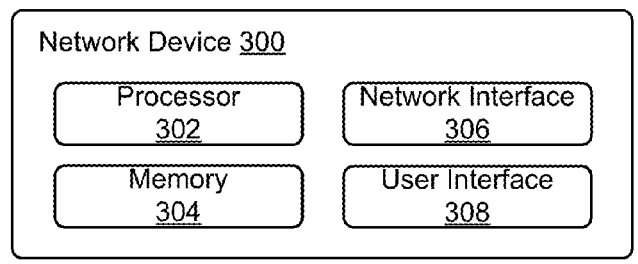
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may enable the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
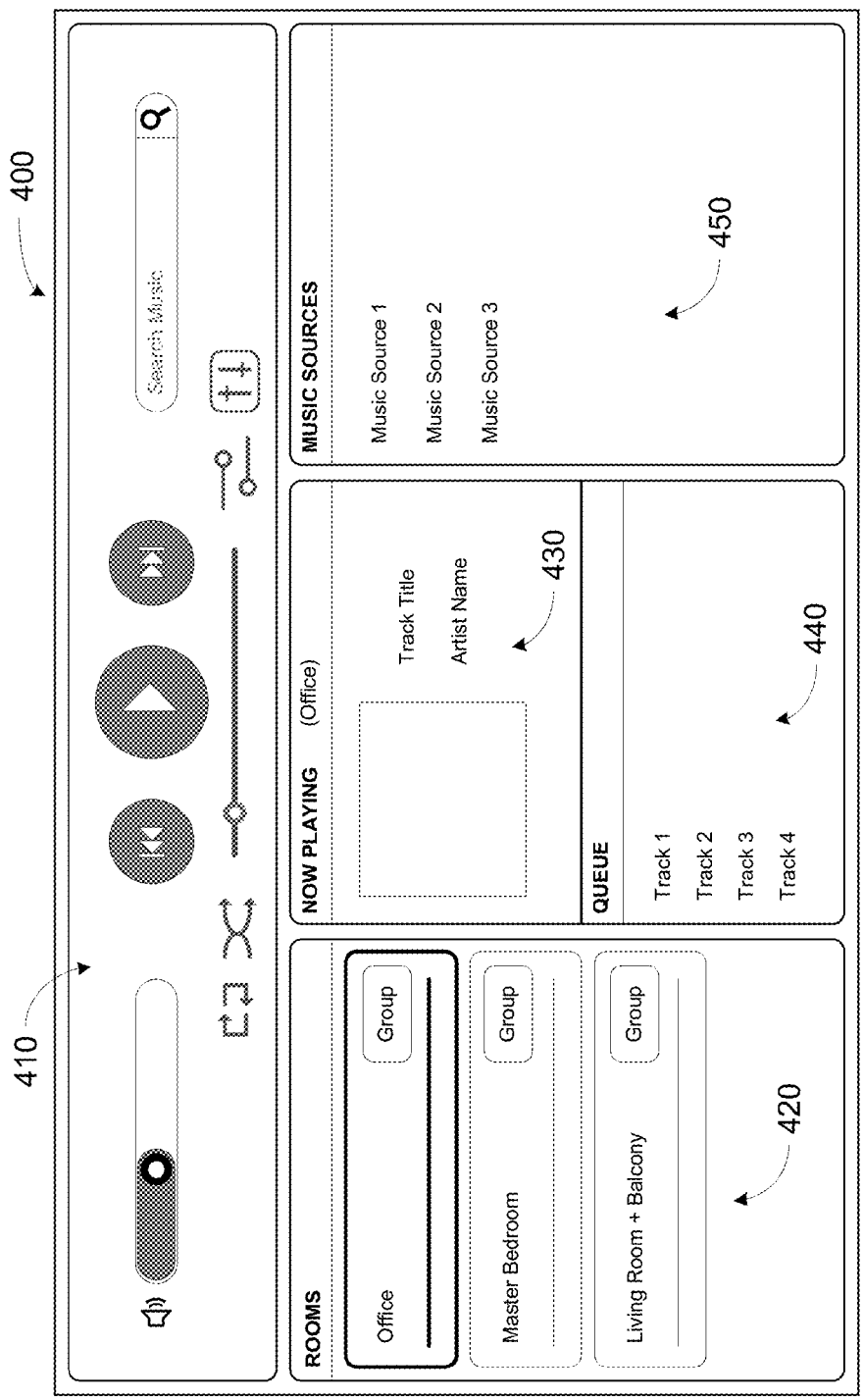
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Shaping of Sound Based on Orientation

In some examples, a sound field produced by one or more playback devices can be shaped based on the orientation of the one or more playback devices. Such shaping of sound may be implemented in any environment for which it may be desirable to conditioned, improved, or otherwise modify sound produced by a playback device. For instance, sound may be shaped when the playback device is used for listening to music and/or watching a video, television or a movie, among other examples. As will be described further below, the ability of the playback device to react to its orientation and shape its output of sound accordingly can be employed with respect to positioning of the playback device and associated component(s), for example. Positioning of the playback device with respect to a base, for example, can affect characteristics of multimedia content output by the playback device.

For example, an audio data stream is obtained by a playback device having one or more speaker drivers (or the playback device is coupled to one or more speaker drivers), an orientation of the playback device, and, in particular, the speaker arrangement is determined, and sound is reproduced by the playback device based on the orientation.

Figure 5A:
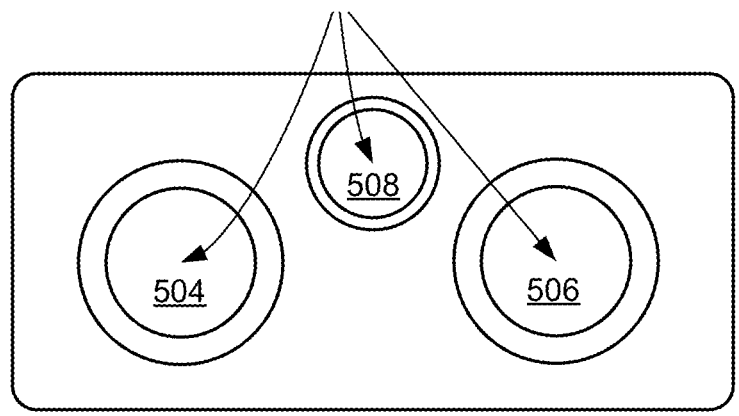
FIG. 5A shows an illustration of an example playback device in a first orientation.

FIG. 5A shows an illustration of an example playback device 500 having a built-in amplifier and speakers 502. The playback device 500 is shown in a first orientation. For sake of discussion, the first orientation may be referred to herein as the "horizontal orientation," though any name may be given to the orientation of the playback device 500 shown in FIG. 5A.

Figure 5B:
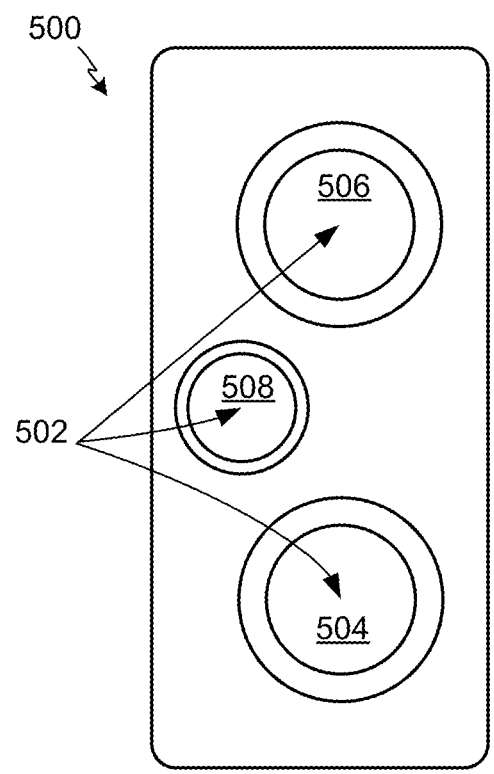
FIG. 5B shows an illustration of the example playback device in a second orientation that is different from the first orientation.

FIG. 5B shows an illustration of the example playback device 500 in a second orientation that is different from the first orientation. For sake of discussion, the second orientation may be referred to herein as the "vertical orientation," though any name may be given to the orientation of the playback device 500 shown in FIG. 5B.

Based on the orientation of the playback device 500, the sound reproduced by the playback device 500 may be shaped differently. For example, the sound coming from each speaker driver may be configured to reproduce a different frequency range, channel, or both frequency range and channel depending on the orientation. In another example, the sound coming from a plurality of speakers 502 in the playback device 500 may be in stereo when in horizontal position, whereas the sound coming from the same plurality of speakers 502 may be in monaural when in vertical position. This allows increased optimization of the sound coming from the playback device 500. Further, this allows customization of the sound coming from the playback device 500.

In an example, a stereophonic signal is reproduced by a plurality of speakers based on a first orientation, and a monaural signal is reproduced by the plurality of speakers based on a second orientation. Using the playback device 500 shown in FIGS. 5A and 5B to illustrate, a stereophonic signal may be reproduced by the playback device in a horizontal orientation. That is, the left channel audio may be routed to the left speaker 504 and the right channel audio may be routed to the right speaker 506. A monaural signal may be routed to the tweeter 508. When the playback device 500 is rotated, and in particular rotated to a 90 degree angle (that is, the vertical orientation), from its previous orientation, the sound characteristics may change. For example, a monaural signal is played out of both the left and right speakers 504 and 506, instead of a stereophonic sound.

In another example, a speaker driver reproduces a monaural signal and either a right or left channel signal based on a first orientation, and the speaker driver reproduces only a monaural signal based on a second orientation. Again, using the playback device 500 to illustrate, in the horizontal orientation, the left speaker 504 may play the left channel audio above a threshold frequency (e.g., above 200 Hz) and a monaural signal below the threshold frequency; likewise, the right speaker 506 may play the right channel audio above a threshold frequency and a monaural signal below the threshold frequency. In a vertical orientation, the left and right speakers 504 and 506 may play a monaural signal and not play separate left and right channels. The tweeter 508 may play a monaural signal in both orientations, but the frequency range may be altered based on the orientation.

In another example, a speaker driver reproduces a first range of frequencies based on a first orientation, and the speaker driver reproduces a second range of frequencies based on a second orientation. Using the tweeter 508 to illustrate, in the horizontal orientation, the tweeter 508 might reproduce frequencies above 7.5 kHz, and in the vertical orientation the tweeter 508 might reproduce frequencies above 3 kHz. As the frequency response changes for the tweeter 508, the sound from the left and right speakers 504 and 508 can also adjust so that the frequency range is accounted for across the listening range.

In an example, the playback device does not contain a display. Thus, in some embodiments, the playback device does contain a display; examples of such playback devices might include a television, a tablet computer (e.g., an Apple, Inc. iPad™ or a Microsoft Windows™ based tablet), or a smart phone or device (e.g., Apple, Inc. iPhone™ or iTouch™). In a fifth embodiment, the playback device is an audio-only device, such as a loudspeaker system. The playback device 500 is an example playback device that does not contain a display.

In addition, it is understood that a speaker arrangement may be connected to a playback device, but physically separate from each other (e.g., such as shown in FIGS. 2B and 2C). Even with such an arrangement, the sound coming from the speaker arrangement may be shaped based on its orientation. As such, the embodiments described herein with respect to sound shaping are not limited to a playback device with built-in speakers.

In certain examples, sound is reproduced by a playback device based on an orientation of the playback device and whether the playback device is paired with another playback device. In some instances, the orientation may be configured to trump the pairing and the sound is reproduced based on the orientation. In some instances, the pairing may be configured to trump the orientation and the sound is reproduced based on the pairing. In some instances, both the orientation and the pairing determine the sound reproduction. In some embodiments, the sound may be reproduced based on orientation and any of: pairing, grouping, and consolidation of playback devices.

Using the playback device 500 shown in FIG. 5A to provide an illustration, a stereophonic signal may be reproduced by the playback device 500 in the horizontal orientation. If the playback device 500 is paired to another playback device, for example, then the playback device 500 will determine that it is paired and horizontal, which will alter the sound coming from the playback device 500. Particularly, if the playback device 500 is the left speaker in a stereo pair, for example, then the left channel audio will be played from the playback device 500. The left speaker 504 may handle one set of frequencies and the right speaker 506 may handle another set of frequencies.

In certain examples, sound is reproduced by a playback device based on an orientation of a different playback device. For example, playback device A and playback device B might be paired, such that the two playback devices reproduce a certain overall sound. In some instances, the sound from playback A may be based on the orientation of playback device B. In some instances, the sound from playback B may be based on the orientation of the playback device A. In some instances, the overall sound may be based on the orientation of both playback devices A and B.

Referring back to FIG. 1, the living room shows two playback devices 106 and 108. The playback devices 106 and 108 may be configured to respond to each other's orientation. For example, the sound coming from the playback device 106 may be based on the orientation of the playback device 108. Similarly, the sound coming from the playback device 108 may be based on the orientation of the playback device 106. As such, the sound coming from both playback devices 106 and 108 may be customizable.

In certain examples, an audio data stream is obtained by a playback device having one or more speaker drivers, an orientation of the playback device is determined, and sound is reproduced by the playback device based on the orientation. In some examples, the audio data stream is modified by the playback device based on the orientation. In some embodiments, the audio data stream is modified prior to being obtained by the playback device, yet the modification is based on the orientation.

In certain examples, a playback device contains one or more speaker drivers that face a particular direction. In some instances, an orientation of the playback device is based on a rotation about an axis that is perpendicular to the front face. That is, the one or more speaker drivers still face the particular direction regardless of the rotation. An illustration of this type of rotation is shown in FIGS. 5A and 5B.

Figure 6A:
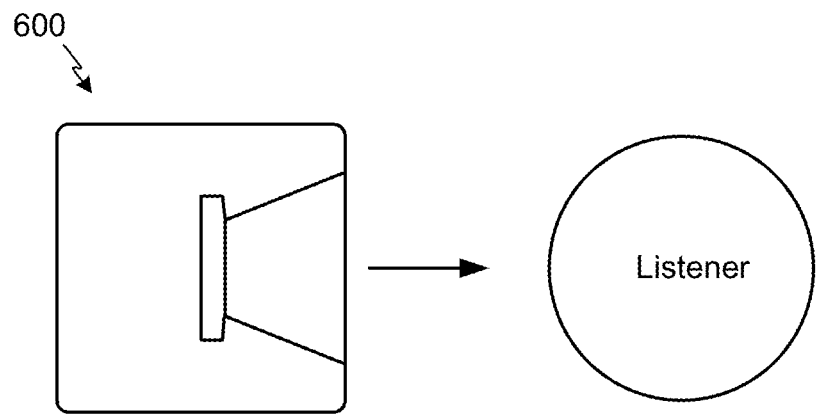
FIGS. 6A and 6B show an example of a change in orientation of an example playback device.
Figure 6B:
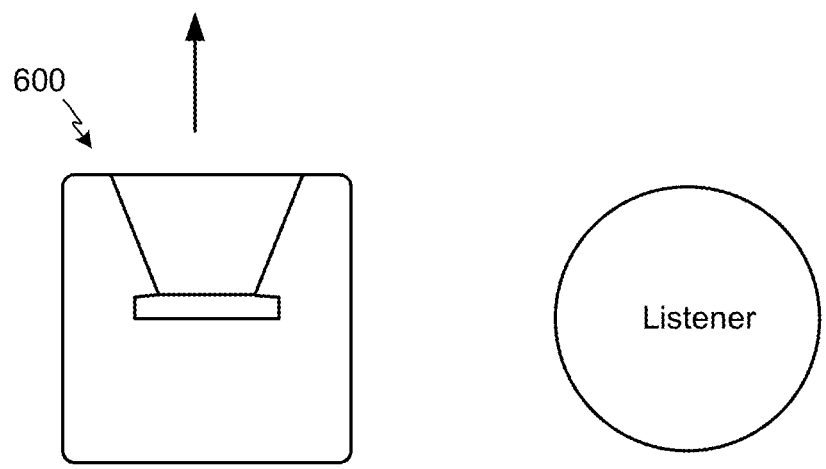

In some instances, an orientation of the playback device is based on a rotation about an axis that is parallel to the front face (or a surface designated as the "front face"). An illustration of this type of rotation is shown in FIGS. 6A and 6B. As such, upon a rotation, the one or more speaker drivers may face a direction that is different from the particular direction. In FIG. 6A, the playback device 600 is generally aimed toward the listener. Upon rotation, as shown in FIG. 6B, the playback device 600 is now generally aimed away from the listener. It is understood that additional speaker drivers may be incorporated into the playback device 600, such that at least one speaker driver always faces the listener regardless of rotation. Then, certain frequencies may be routed to speakers that face the listener (directional frequencies) and certain frequencies may be routed to speakers that do not face the listener (non-directional frequencies).

In some instances, an orientation of a playback device is based on a rotation about more than one axis. That is, a playback device may be rotated about two or more axes. The sound output from the playback device or another playback device may be based on the particular rotation.

Figure 7:
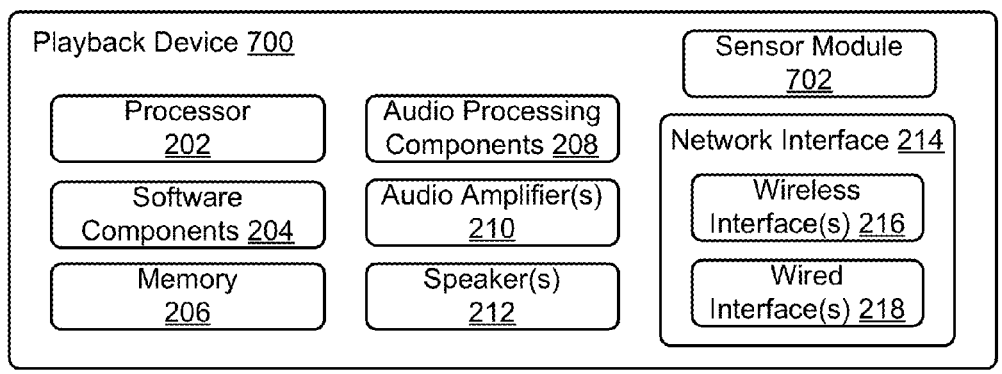
FIG. 7 shows an example functional block diagram of a playback device in accordance with an embodiment.

FIG. 7 shows an example functional block diagram of a playback device 700 in accordance with an embodiment. The functional block diagram in FIG. 7 is similar to the functional block diagram of the playback device 200 of FIG. 2, and further includes a sensor module 702. As such, many of the reference numerals are shared between figures.

In certain embodiments, the sensor module 702 includes an accelerometer to detect how the playback device 700, and in particular, how the speaker driver(s) are oriented. In certain embodiments, the accelerometer device is a three axes accelerometer. Based on the orientation, the sound output from the playback device 700 or other zone player(s), whose sound may depend on the orientation of the playback device 700, may be shaped.

In certain embodiments, other types of sensors may be employed to detect position and orientation of the playback device 700. For example, a sensor may be used to determine speaker position relative to any of: a floor, wall, and ceiling. This information may be used to, for example, determine the speaker height relative to a listener in a room or the speaker distance from a wall or corner, and based on that information, an audio characteristic of one or more playback devices may be determined. For example, an audio characteristic of one playback device might be determined, or an audio characteristic for any of a number of different playback devices within a local area may be determined to better optimize the sound environment based on the orientation.

Figure 8:
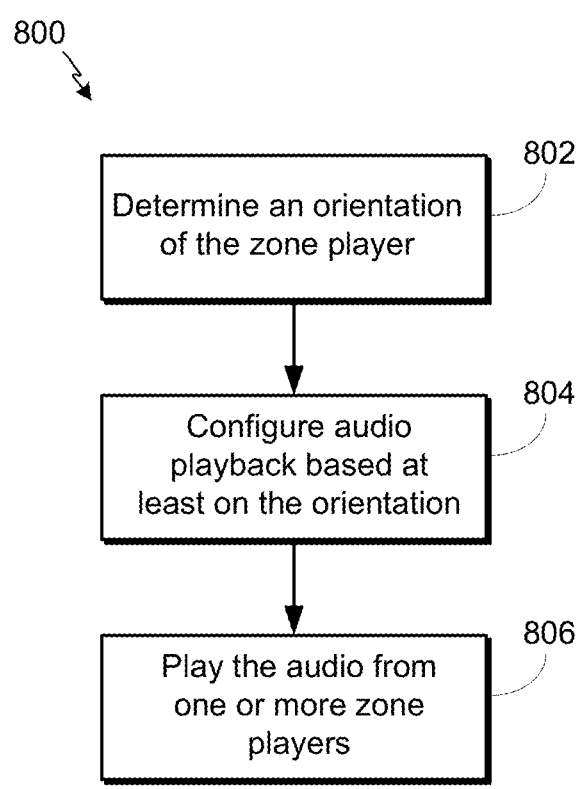
FIG. 8 shows a flowchart that illustrates an example method for processing an audio signal based on an orientation of a playback device.

FIG. 8 shows a flowchart that illustrates an example method 800 for processing an audio signal based on an orientation of a playback device. The playback device can be positioned in a particular orientation using a base, for example. The method 800 may be iteratively performed to accommodate a change in orientation. Further, although the method 800 is described about a rotation of a playback device detected by a sensor module 702, it is understood that the method 800 is equally applicable should the rotation be manually entered, or a height or other physical offset be provided. The method 800 may be understood in conjunction with the playback device of FIG. 7, and therefore, the description references FIG. 7 to facilitate easy understanding of the example method embodiment.

The method 800 starts at block 802 by determining an orientation of the playback device 700. For example, using an accelerometer and/or other position sensor, an orientation (e.g., landscape, portrait, etc.) of the playback device 700 is determined with respect to an underlying surface (e.g., a table, counter, floor, shelf, ledge, cabinet, etc.). In some examples, the playback device 700 may be positioned with respect to a base as well as with respect to an underlying surface. Block 802 might be triggered when the playback device 700 is turned on, when the playback device 700 is ready to play audio, when a particular time interval expires, when the playback device 700 is repositioned, and/or upon some other programmed trigger point. Irrespective of the trigger point, the sensor module 800 is activated to detect the orientation of the playback device 700, and in particular, to detect the orientation of the speaker array that provides the sound. Depending on implementation, the sensor module 702 may output a sensor signal or a set of sensor signals. The sensor signal(s) may be provided to the processor 202, which is configured to determine the orientation based on the signal(s), and provides the orientation data to the audio processing component 208 to process the audio.

According to certain embodiments, when the audio is processed upstream from the playback device 400 based on the orientation of the playback device 200 or when the orientation of the playback device 700 is important to other connected playback devices for group audio shaping, then the processor 202 may provide the orientation data from block 802 to another playback device (also referred to as a zone player) via the network interface 214. In some embodiments, such as when the audio is processed upstream from the playback device 700, the audio processing component 208 may not need to provide any additional audio processing based on the orientation.

At block 804, the audio is configured and routed to the appropriate speaker based on the orientation. In some embodiments, the audio is configured by the playback device 700, itself, via the audio processing component 208, for example. In some embodiments, the audio is configured upstream from the playback device 700. The configured audio may then be sent to the playback device 700 for play. In some embodiments, the audio is configured and routed based on at least two states of the playback device 700: orientation and whether the playback device is paired, grouped, or consolidated with one or more additional playback devices. At block 806, the audio is played from one or more playback devices.

III. Example Playback Device Positioning Systems and Methods

As discussed above, position and orientation of a playback device can impact playback settings and/or other playback characteristics of the playback device. Certain examples provide a playback device that can be oriented on three (3) sides: a horizontal orientation and two (2) vertical orientations. The playback device is associated with a base (e.g., a rubber base, plastic base, glass base, metal base, etc.) that accommodates the playback device in any of the three orientations. The playback device has one or more playback settings that can be affected by a position and/or orientation of the playback device with respect to a base on which the playback device can be positioned. For example, playback settings can include play mode (e.g., play/no play, etc.), equalization (EQ) setting(s) (e.g., volume, treble, base, balance, loudness (e.g., a boost of certain frequency(-ies)), etc.), and/or other sound setting, based on a determination that the playback device is resting on the base correctly.

a. Example Playback Device and Base

Figure 9A:
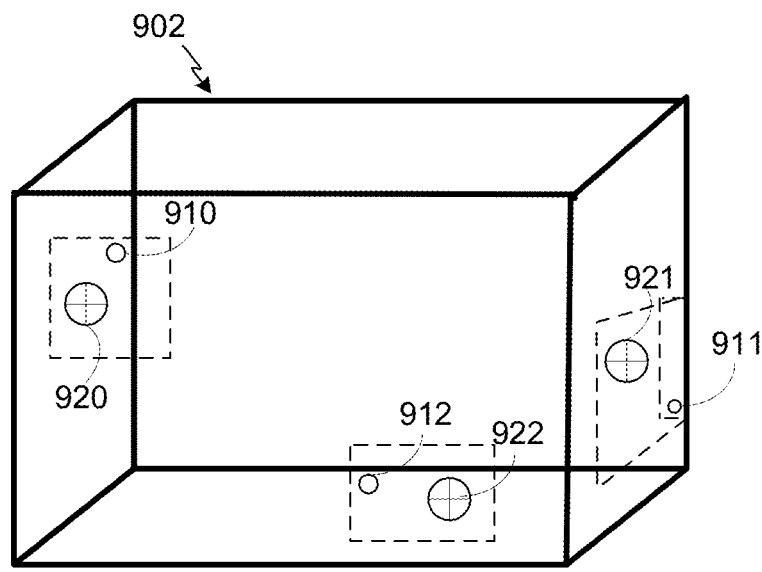
FIG. 9A illustrates an example playback device.

FIG. 9A illustrates an example playback device 902 for playback of audio and/or other multimedia content. The playback device 902 may be similar to playback devices 102-124, 200, 500, 600, and/or 700 disclosed and described above. As in the playback device 700, for example, the playback device 902 includes a processor 202, software component(s) 204, memory 206, audio processing component(s) 208, audio amplifier(s) 210, speaker(s) 212, network interface 214 (e.g., wired 216 and/or wireless 218), and sensor module 702.

The example playback device 902 includes one or more sensors 910-912 included in and/or mounted on the playback device 902. Sensor(s) 910-912 can be arranged with respect to a side of the playback device 902 (e.g., one on each of three sides of the playback device 902, one on each side of the playback device 902, etc.). Sensor(s) 910-912, 953 can be Hall effect sensors, other magnetic field-based sensors, and/or other proximity sensors (e.g., near field communication (NFC) sensors, light sensors, optical sensors, global positioning system (GPS) or beacon sensors, etc.), for example. In one example, three sensors 910-912 are placed in the playback device 902, one on each of three sides of the playback device 902 (e.g., off-center toward the rear corner of the side for detection).

The example playback device 902 also includes one or more fasteners 920-922 incorporated in and/or mounted on the playback device 902. In certain examples, one or more of the sensors 910-912 and fasteners 920-922 may be integrated into a single fastener/sensor. The one or more fasteners 920-922 can be constructed from any magnetic material (e.g. a magnet), such as neodymium, steel, etc., and can be arranged with respect to a side of the playback device 902 (e.g., one on each of three sides of the playback device 902, one on each side of the playback device 902, etc.). The fastener(s) 920-922 can be centered, for example, on or in their respective side of the playback device 902.

Figure 9B:
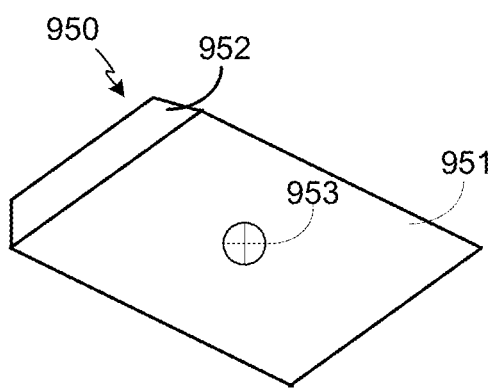
FIG. 9B illustrates an example base for a playback device.

FIG. 9B illustrates an example base 950, also referred to herein as a foot, pedestal, mount, etc. The example base 950 includes a primary portion 951 and a secondary portion 952, which is raised or angled with respect to the primary portion 951. In some examples, the base 950 does not include the secondary portion 952, or the secondary portion 952 is not raised or angled with respect to the primary portion 951. The base 950 includes a fastener 953 incorporated in or mounted on the base 950. The fastener 953 is used to help removably couple, attach, position, and/or otherwise engage the base 950 with the playback device 902. As with fasteners 920-922 in the playback device 902, the fastener 953 can be formed from any magnetic material, such as neodymium, steel, etc., and is positioned on or within the base 950. In certain examples, no fastener 953 is included in the base 950.

In certain examples, the base may also include an additional sensor, similar to the sensor(s) 910-912 in the playback device 902 (e.g., a Hall effect sensor, other magnetic field-based sensor, and/or other proximity sensor such as NFC sensor, light sensor, optical sensor, GPS or beacon sensor, etc.). However, as shown in FIG. 9B, the base 950 can be implemented without a sensor as well.

The base 950 can be provided with the playback device 902 or may be provided separately. The base 950 can be formed from a rubberized material and/or plastic, for example, to provide slip resistance to the playback device. The base 950 is used to provide support, assist in proper positioning (e.g., using the fastener 953 and secondary portion 952 to properly position the playback device 902 with respect to the primary portion 951). The base 950 is removably affixed, coupled, positioned, or otherwise engaged with respect to the playback device 902, for example.

In certain examples, the base 950 can be powered to serve as an inductive charging pad for the playback device 902. In certain examples, the base 950 can include a processor, memory, and network interface(s) to serve as a wireless access point. In such examples, when the playback device 902 is docked with the base 950, the base 950 can provide network communication services and access to the playback device 902 rather than the device 902 utilizing components internal to the playback device 902 for such network communication.

b. Example Position Determination

In certain examples, the base 950 is arranged, structured, and/or otherwise configured to dock with a particular size and/or type of playback device 902 (e.g., a Play:1™, Play:3™, Play:5™, PlayBar, Sub, etc., manufactured by Sonos, Inc., of Santa Barbara, Calif., among other examples including playback devices not manufactured by Sonos, Inc.). In other examples, the base 950 is designed to accommodate a variety of playback devices 902.

The one or more sensors 910-912 in the playback device 902 are arranged to detect a positioning of the playback device 902 with respect to a base, such as the base 950 illustrated in the example of FIG. 9B. Sensor(s) 910-912 can be arranged with respect to a side of the playback device 902 (e.g., one on each of three sides of the playback device 902, one on each side of the playback device 902, etc.). Sensor(s) 910-912, 953 can be Hall effect sensors, other magnetic field-based sensors, and/or other proximity sensors (e.g., near field communication (NFC) sensors, light sensors, optical sensors, global positioning system (GPS) or beacon sensors, etc.), for example. In one example, three sensors 910-912 are placed in the playback device 902, one on each of three sides of the playback device 902 (e.g., off-center toward the rear corner of the side for detection).

The one or more fasteners 920-922 can be constructed from any magnetic material (e.g. a magnet), such as neodymium, steel, etc., and can be arranged with respect to a side of the playback device 902 (e.g., one on each of three sides of the playback device 902, one on each side of the playback device 902, etc.). The fastener(s) 920-922 can be centered, for example, on or in their respective side of the playback device 902. Similarly, the fastener 953 can be formed from any magnetic material, such as neodymium, steel, etc., and is positioned on or within the base 950.

One of the fastener(s) 920-922 in the playback device 902 engages with the fastener 953 of the base 950 to position the playback device 902 with respect to the base 950 (or vice-versa). Attraction between the fastener 953 in the base 950 and a nearest fastener 920-922 in the playback device 902 helps to ensure proper alignment of the base 950 with respect to the playback device 902 (or vice versa). Additionally, the fastener(s) 920-922, 953 help to prevent the playback device 902 from moving (e.g., sliding, "walking", jumping, tipping, etc.) with respect to the base 950 when properly engaged. That is, the fastener(s) 920-922, 953 help the base 950 to stabilize the playback device 902 and guard against jostling as well as movement caused by vibration at high volume and/or bass level, for example.

In certain examples, a fastener 920-922 in the playback device 902 engages the base 950 without a fastener 953 in the base 950. For example, material of the base 950 itself is attracted to the fastener 920-922 and/or serves as a mount or cradle for the fastener 920-922 without any particular attraction between the material of the base 950 and the material of the fastener 920-922.

One of the sensor(s) 910-912 in the playback device 902 interacts with the fastener 953 to measure, detect, and/or otherwise determine placement of the base 950 with respect to the playback device 902. For example, when a fastener 920-922 of the playback device 902 is engaged with the fastener 953 of the base 950, a corresponding sensor 910-912 of the playback device 902 is also positioned near the base fastener 953. The sensor 910-912 of the playback device 902 that is positioned in proximity to the fastener 953 of the base 950 can be used to identify a location of the base 950 with respect to the playback device 902 (e.g., which side of the playback device 902 is in contact with the base 950). Position can be determined using a variety of approaches including measurement of a distance between sensors 910-912, a change in signal strength, etc., by the processor 202 of the playback device 902 in communication with the relevant sensor(s) 910-912 (and, in some examples, the fastener 953).

For example, if fastener 922 is engaged with fastener 953 to hold the playback device 902 against the base 950, off-center sensor 912 is positioned near the fastener 953. A processor in the playback device 902 (e.g., processor 202, working alone or in conjunction with the sensor module 702) determines that a signal received from the sensor 912 is strongest compared to other sensors 910-911. The processor then extrapolates that the side of the playback device 902 on which the sensor 912 is located is the side of the playback device 902 which is engaged with the base 950.

In certain examples, detection of proper playback device 902—base 950 alignment can be determined using NFC (or other wireless communication protocol) between the base 950 and playback device 902, as well as or in addition to magnetic-based sensor detection. In certain examples, a pressure sensor in the base 950 and/or playback device 902 can be used to determine engagement of the playback device 902. In certain examples, positioning of the playback device 902 with respect to the base 950 changes an angle of the playback device 902, and an accelerometer or other sensor in the playback device 902 can detect that change in angle and use the change to determine position.

Thus, using sensor(s) 910-912, the playback device 902 can determine whether the base 950 is positioned with respect to the playback device 902, on which side of the playback device 902 the base is engaged, whether the base 950 is upside down, whether the playback device 902 is properly seated in the base 950, etc. As described above, the playback device 902 also determines its orientation. Therefore, by combining base 950 location with respect to an orientation of the playback device 902, the playback device 902 can determine whether the base 950 is properly positioned with respect to the playback device 902 or whether it is 180 degrees off and/or otherwise not properly located for a given device 902 orientation, for example.

In certain examples, movement of the playback device 902 can also be determined using one or more sensors such as sensors 912-922, an accelerometer in the playback device 902, a light sensor, an optical sensor, a GPS or beacon, etc. Playback device 902 functionality can be limited and/or otherwise affected by movement as well as orientation and positioning, for example.

In certain examples, a graphical user interface (GUI) on the playback device 902 and/or an associated controller, such as control device 300, controller interface 400, etc., can provide a one or more visual cues, such as notification of correct and/or incorrect positioning of the base 950 with respect to the playback device 902 for current device 902 orientation. The GUI can also be used to provide instruction regarding how to correct the base 950 positioning. The GUI can also provide information regarding drawback(s) of incorrect positioning, benefit(s) of correct positioning, and the like.

In certain examples, one or more of the base 950 and playback device 902 includes a light emitting diode (LED) and/or other visible indication of correct versus incorrect base 950 position. For example, an LED can glow a green color if positioning is proper and red is positioning is improper. The LED might also glow yellow if positioning is indeterminate between proper and improper (e.g., close or overlapping enough to operate but not exactly correct).

In certain examples, play back and/or other functionality of the playback device 902 is affected by correct/incorrect position of the base 950 with respect to the playback device 902. For example, volume may be limited if the base 950 is in an incorrect position with respect to the playback device 902. For example, the playback device 902 may move along a surface if the volume is too loud and the base 950 isn't providing stability, so volume for play back is capped or limited, bass level is reduced, etc. Sound shaping parameters and/or other equalization may be limited if positioning is not proper, for example. The processor 202 drives play back of audio from speaker(s) 212 of the playback device 902 based on sensor input (e.g., position and orientation sensor input).

In certain examples, the base 950 can include wireless charging for a battery in the playback device 902. Proper positioning of the base 950 with respect to the playback device 902 ensures proper charging of the playback device 902 by the base 950. Improper positioning results in inefficient, limited, or no charging of the playback device 902 via the base 950, for example.

In certain examples, positioning determination can be overridden or disabled automatically and/or by a user. For example, positioning determination (and associated limits) can be disabled when the playback device 902 is supported using a wall or ceiling mount (e.g., a sensor 910-922 in the playback device 902 detects that a threaded wall/ceiling mount provided in the playback device 902 is being used). In other examples, a wall- or ceiling-mounted playback device 902 can adjust its equalization and/or other playback setting based on its orientation mounted with respect to the wall or ceiling.

Figure 10A:
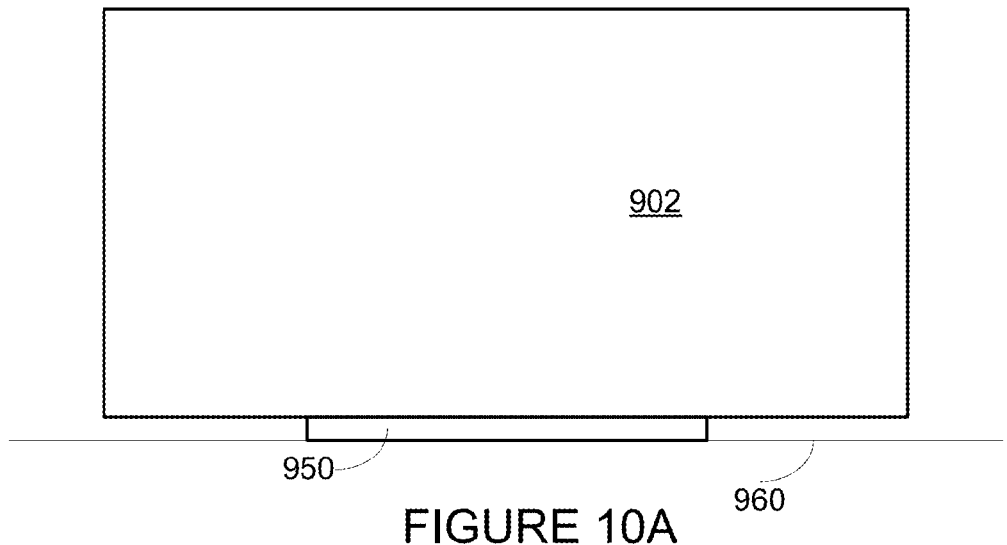
FIG. 10A shows an example playback device positioned on a base in a landscape orientation with respect to a surface.
Figure 10B:
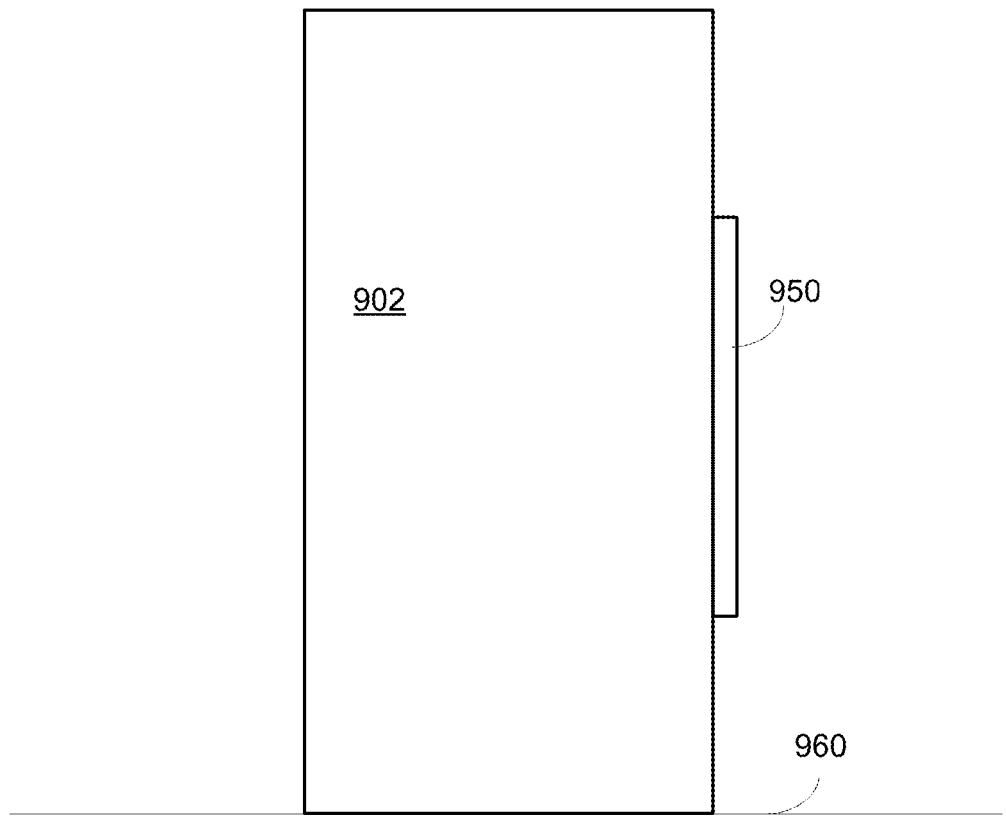
FIG. 10B illustrates the example playback device of FIG. 10A in a portrait orientation with respect to the surface.

FIG. 10A shows the playback device 902 positioned on the base 950 in a landscape orientation with respect to a surface 960 (e.g., a table, counter, floor, shelf, ledge, cabinet, etc.). FIG. 10B illustrates the playback device 902 once the device 902 has been reoriented in a portrait orientation with respect to the surface 960. However, as shown in the example of FIG. 10B, the base 950 is still attached to a bottom (or top) of the playback device 902 as if the playback device 902 were still in a landscape orientation. Using the example of FIGS. 9A and 9B, the sensor 912 detects that the fastener 922 of the playback device is still engaged with the fastener 953 of the base 950, and the sensor 910 does not detect engagement with the base fastener 953 on the side of playback device fastener 920. The sensor module 702 determines the change in orientation of the playback device 902 from landscape to portrait. Such base 950 positioning is not proper for the device's current orientation and does not aid in stability of the playback device 902 with respect to the surface 960.

Thus, for example, the playback device 902 can determine whether it is properly positioned on a surface (e.g., having enough slip resistance) to enable audio playback of a certain loudness and/or equalization. The determination is based on whether the device 920 is properly placed on the base 950. In some examples, an accelerometer in the playback device 902 detects the motion of the device 902 as it is moved from landscape to portrait orientation.

c. Example Notification and Prompting Regarding Positioning

Figure 11:
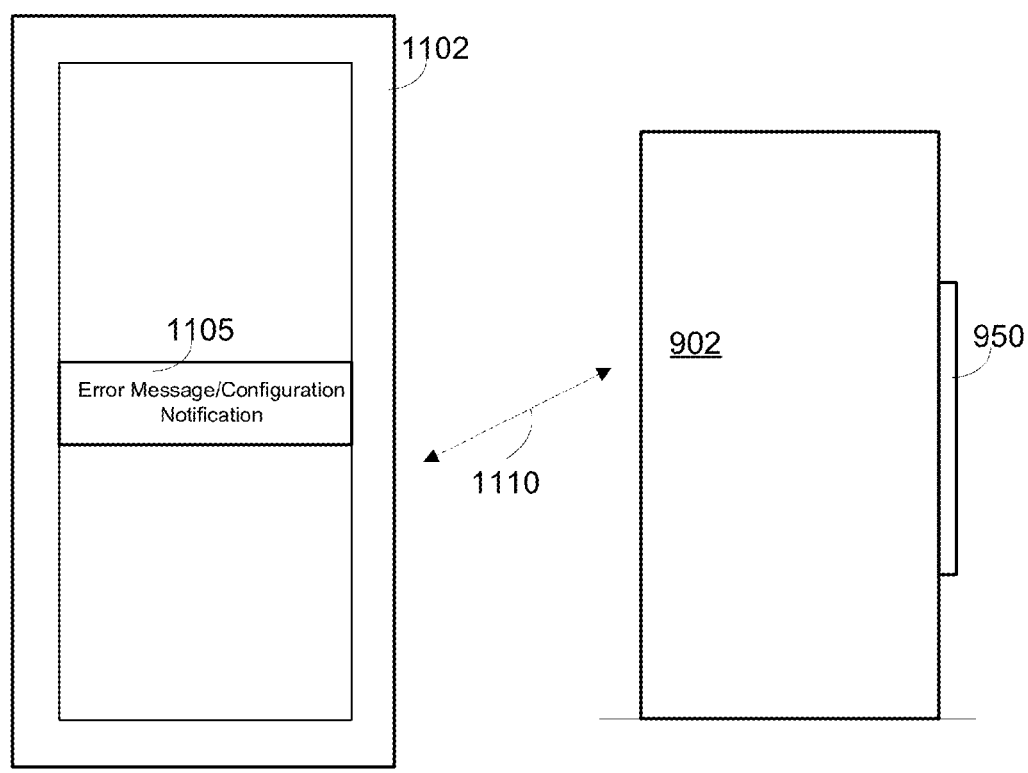
FIG. 11 illustrates an example interaction between a playback device and a controller.

As shown in FIG. 11, for example, after the accelerometer or other position detector settles for a period of time (e.g., 30 seconds) and the sensor 912 detects no further change in the position of the base 950 with respect to the playback device 902, a notification 1105 (e.g., a push notification) is generated noting the improper positioning of the base 950. The notification 1105 can be provided to a user via the playback device 902 and/or a separate controller 1102 via a wireless communication connection between the playback device 902 and controller 1102. The notification 1105 can prompt the user to correct the position and/or otherwise provide instruction to the user regarding potential impact and response.

Figure 12A:
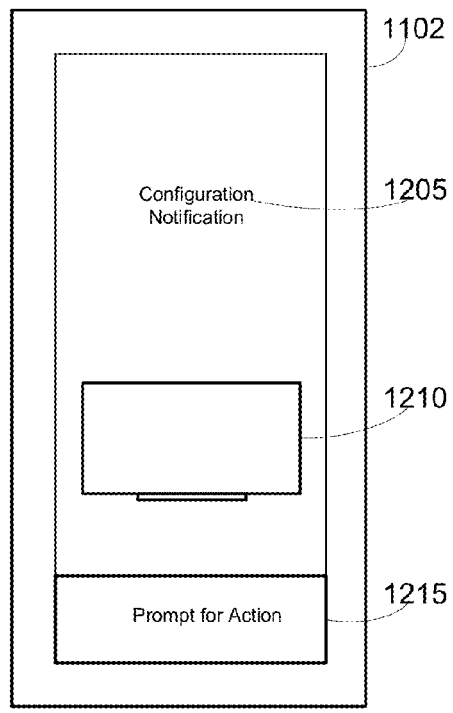
FIGS. 12A and 12B show example notification information provided to a user via a graphical user interface on a controller.
Figure 12B:
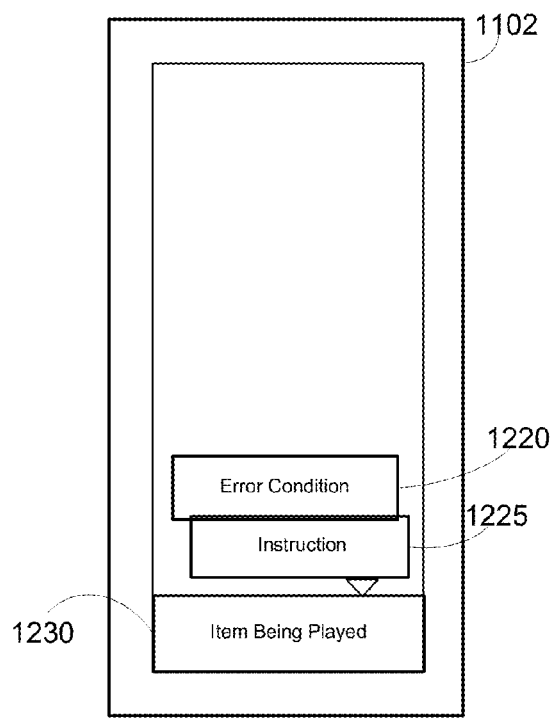

FIGS. 12A and 12B provide some examples of notification information provided to a user via a graphical user interface on a controller. As shown in the example of FIG. 12A, a positioning and/or other configuration notification 1205 can be displayed to a user via the controller 1102, along with a picture or other stylized visualization of a correct positioning of the playback device 902 and base 950. Additionally, the user can be prompted for an acknowledgement or action 1215 via the controller 1102. For example, the controller 1102 presents a message 1205 telling the user that the playback device 902 is missing its base (e.g., its "foot") and provides an image and/or other visual cue 1210 showing the user the correct positioning of the device with respect to the base. Further, the user is asked to acknowledge 1215 that he or she will correct the problem, make the adjustment, etc.

As shown in the example of FIG. 12B, an interface of the example controller 1102 may show a current item being played 1230 along with an error condition 1220 impacting play back based on position and/or orientation of the playback device 902 and/or base 950. The example interface further provides an instruction 1225 to help the user correct the problem (e.g., add the base 950 to the playback device 902, adjust the position of the playback device 902 with respect to the base 950, etc.).

d. Example Positioning and Playback Methods

Figure 13:
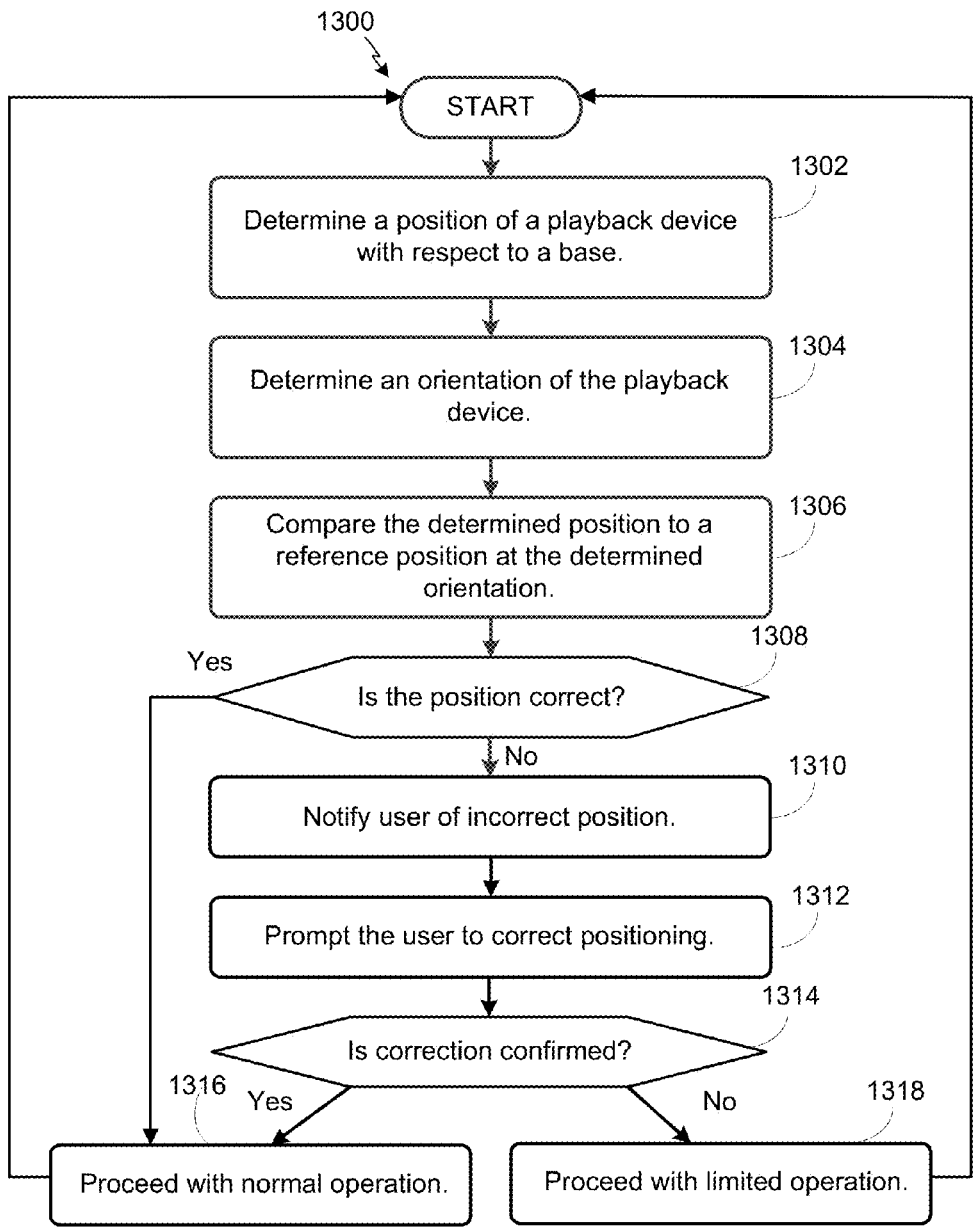
FIG. 13 shows a flow diagram of an example method to enable playback of multimedia content using positioning information.

A method 1300 shown in FIG. 13 presents an embodiment of a method that can be implemented within an operating environment involving, for example, the media playback system 100 of FIG. 1, one or more of the playback device 200 of FIG. 2, the playback device 500 of FIGS. 5A-5B, the playback device 600 of FIGS. 6A-6B, the playback device 700 of FIG. 7, the playback device 902 of FIGS. 9A-11, one or more of the control device 300 of FIG. 3, and the controller 1102 of FIGS. 11-12B. The method 1300 may include one or more operations, functions, or actions as illustrated by one or more of blocks 1302-1318. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 1300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 1300 and other processes and methods disclosed herein, each block in FIG. 13 may represent circuitry that is wired to perform the specific logical functions in the process.

FIG. 13 shows a flow diagram of an example method 1300 to enable playback of multimedia content using positioning information. At block 1302, a position of a playback device with respect to a base is determined. For example, a sensor 910-912 is used to measure, detect, and/or otherwise determine a position of the playback device 902 with respect to the base 950. The playback device 902 is removably engaged with the base 950 using a combination of fasteners 920-922, 953 and/or other temporary connector. Proximity of a sensor 910-912 in the playback device 902 to a fastener 953 in the base 950 provides an indication of the position of the playback device 902 with respect to the base 950, for example.

At block 1304, an orientation of the playback device is determined. For example, using an accelerometer and/or other position, a sensor module 702 of the playback device 902 determines an orientation (e.g., landscape, portrait, etc.) with respect to an underlying surface (e.g., a table, counter, floor, shelf, ledge, cabinet, etc.). Orientation and/or other positioning of the playback device (e.g., with respect to a base) may affect one or more playback settings of the playback device, for example.

At block 1306, the determined position of the playback device is compared to a proper position of the playback device with respect to the base for the determined orientation of the playback device. For example, the processor 202 and sensor module 702 of the playback device 700, 902 compare the determined position of the playback device 902 with respect to the base 950 to a stored or reference set of available position(s) for the determined orientation (e.g., if the playback device 902 is in a landscape orientation, then either a top or bottom of the playback device 902 should be resting on the base 950).

At block 1308, based on the comparison, the determined position is identified as correct or incorrect. For example, if the playback device 902 is positioned on top of the base 950 and is in a landscape orientation, as in the example of FIG. 10A, then the processor 202 and sensor module 702 of the playback device 902 determine that the base 950 is in proper or correct position with respect to the playback device 902 (or vice versa that the playback device 902 is in correct position with respect to the base 950). However, if the playback device 902 is in a portrait orientation and the base 950 is position on a top or bottom of the playback device 902, as in the example of FIG. 10B, then the processor 202 and sensor module 702 determine that the base 950 is improper or incorrect position with respect to the playback device 902 (or vice versa). If the position is correct, then normal operation proceeds at block 1318. In certain examples, the user is notified of correct positioning via one or more of the playback device, base, or external controller (e.g., via indicator light, GUI message, tone/sound, etc.).

At block 1310, if the position is determined to be improper/incorrect, then a notification of incorrect positioning is generated. For example, a notification is generated (e.g., by the playback device, the base, and/or a separate controller) to inform, alert, and/or otherwise notify the user that the position of the playback device with respect to the base (or vice versa) is incorrect. For example, a notification of incorrect positioning can be output via one or more of the playback device, base, or external controller (e.g., via indicator light, GUI message, tone/sound, etc.) (see, e.g., the example of FIGS. 11, 12A and 12B described above).

At block 1312, a prompt is generated to correct the position of the base and/or playback device. For example, a prompt can be generated to prompt and/or otherwise encourage a user to correct the position of the base and/or playback device. The prompt can be generated at the playback device, the base, and/or controller used to control the playback device (e.g., via an interface located in or on the playback device, base, and/or controller), for example. However, in some examples, aside from the user notification of incorrect positioning, the user may not be prompted for further action. If the user is prompted, as shown and described, for example, with respect to FIGS. 11, 12A, and 12B above, a message (e.g., alphanumeric, graphical, and/or audible) is provided to the user via the playback device 902, the base 950, and/or the controller 1102, for example. In certain examples, a verification is generated and displayed via an interface to ask the user to verify that he or she will and/or has undertaken corrective action (e.g., select to accept or confirm, etc.).

At block 1314, correction of the position is confirmed. For example, orientation and position can be re-checked to determine if the playback device and base are now in a correct position for the device orientation or are still positioned incorrectly.

If positioning has not been corrected or cannot be confirmed, then, at block 1316, operation proceeds at a limited level. In limited operation, shaping of sound output by one or more speaker drivers in the playback device and/or one or more other playback settings of the playback device are affected by improper playback device and/or base position, for example. Playback settings can include play mode (e.g., play/no play, etc.), equalization (EQ) setting(s) (e.g., volume, treble, base, balance, loudness (e.g., a boost of certain frequency(-ies)), etc.), and/or other sound setting, based on a determination that the playback device is positioned correctly with respect to the base. For example, the playback device 902 plays audio at a lower volume (or with a reduced maximum volume level), bass level is limited, control functionality is limited, another equalization setting is modified, etc.

In certain examples, changing EQ setting(s) of the playback device can include turning on or off (or effectively muting) one or more specific speaker drivers, changing a channel output of one or more speaker drivers, changing a frequency response of one or more specific speaker drivers, changing an amplifier gain of any particular speaker driver, changing the amplifier gain of the playback device as a whole, etc. In certain examples, changing the EQ settings of the playback device (e.g., changing the equalization of one or more speaker drivers of the playback device) may affect frequency dependent parameters. Examples can include the adjustment of a strength of frequencies within provided audio data, a phase adjustment, and time-delay adjustment.

In an example, an interface of the playback device and/or a controller associated with the playback device (e.g., the example controller 1102 shown in FIGS. 12A and 12B) can display a message and/or other notification (e.g., color, animation, tone, text, etc.) indicating the presence of an error condition and/or otherwise conveying that the playback device is operating in a limited mode (e.g., that one or more playback settings of the playback device are impacted by improper positioning of the playback device and/or base).

However, if correct positioning is confirmed, then, at block 1318, normal operation proceeds. That is, the playback device 902 operates normally as directed by the user, configuration, scene, theme, zone group, playlist, multimedia content, equalization setting, etc.

Thus, for example, in operation, a playback device outputs content according to one or more playback settings. Operation for playback and/or other configuration of the playback device occurs and/or is adjusted in response to a determination of playback device orientation and position with respect to a base (e.g., a measurement and/or other detection of the base with respect to the playback device (e.g., with respect to a fastener on or in the playback device). If the position of the playback device/base at the determined orientation is correct, then playback of media content by the playback device occurs according to a first playback setting. However, if the position of the playback device/base at the determined orientation is incorrect, then playback of media content by the playback device occurs differently from the first playback setting (e.g., with a second playback setting, based on an adjustment of the first playback setting, etc.). Such adjustment of playback and/or other configuration of the playback device in response to determination of orientation and position can occur immediately after the determination, substantially immediately after the determination (e.g., accounting for some processing and/or data transmission delay and/or other electronic latency, etc.), upon a subsequent initiation of playback via the playback device and/or a controller to control the playback device (e.g., a smartphone controller application, a laptop controller application, a desktop controller application, a tablet computer controller application, a hardware controller, etc.).

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The example embodiments described herein provide for numerous ways to shape sound and/or otherwise affect playback within an environment based on playback device orientation and alignment of a base with respect to the playback device. In some examples, playback modification is further impacted by a state or status of the playback device, such as whether the playback device is paired, grouped, or consolidated with one or more additional playback devices. Technology from the example embodiments may be used in any application where accurately reproduced sound is desired, such as in motorized vehicles, boats, airplanes, and in outdoor locations.

As indicated above, the examples provided herein involve determining a position of a base with respect to a playback device and evaluating whether the position is proper or improper given an orientation of the playback device. In one aspect, a playback device is provided. The example playback device includes a first fastener located on a first side of the playback device, a processor, and memory having stored thereon instructions executable by the processor to cause the computing device to perform functions. The functions include determining that a base is not coupled to the playback device via the first fastener and, in response to determining that the base is not coupled to the playback device via the first fastener, adjusting a playback setting of the playback device. The functions further include facilitating output of content via the playback device according to the adjusted playback setting.

In certain examples, the determining further includes identifying an orientation of the playback device, wherein adjusting the playback setting of the playback device occurs further in response to identifying the orientation of the playback device. In certain examples, the orientation is identified using an accelerometer. In certain examples, the instructions are further executable by the processor to perform functions including determining that the playback device is mounted to a wall, wherein adjusting the playback setting of the playback device occurs further in response to determining that the playback device is mounted to the wall. In certain examples, adjusting the playback setting of the playback device includes adjusting a volume level of the playback device. In certain examples, adjusting the playback setting of the playback device includes limiting a maximum volume level of the playback device. In certain examples, adjusting the playback setting of the playback device includes adjusting an equalization setting of the playback device.

In certain examples, the fastener includes a magnet. In certain examples, determining that the base is not coupled to the playback device via the first fastener includes determining, via a magnet sensor, that the base is not coupled to the playback device.

In certain examples, the instructions are further executable by the processor to perform functions including, in response to determining that the playback device is not coupled to the base, causing an indication that the playback device is not coupled to the base to be provided. In certain examples, causing the indication to be provided further includes causing the indication to be provided via at least one of the playback device, the base, and a controller of the playback device. In certain examples, the indication includes a visual indication that the playback device is not properly positioned with respect to the base. In certain examples, the indication includes an audible indication that the playback device is not properly positioned with respect to the base. In certain examples, the indication includes a prompt to correct positioning of the playback device with respect to the base.

In certain examples, the playback device further includes a second fastener located on a second side of the playback device and a third fastener located on a third side of the playback device.

In another aspect, a computer readable storage device is provided. The example computer readable storage device includes instructions stored thereon which, when executed by a processor, cause the processor to implement a method. The method includes determining that a base is not coupled to a playback device via a first fastener of the playback device, and, in response to determining that the base is not coupled to the playback device via the first fastener, adjusting a playback setting of the playback device. The method includes facilitating output of content via the playback device according to the adjusted playback setting.

In certain examples, the determining further includes identifying an orientation of the playback device, wherein adjusting the playback setting of the playback device occurs further in response to identifying the orientation of the playback device. In certain examples, adjusting the playback setting of the playback device includes adjusting a volume level of the playback device. In certain examples, the method further includes, in response to determining that the playback device is not coupled to the base, providing at least one of a message, a visual indicator, and an audible indicator to a user indicating that the playback device is not properly positioned with respect to the base. In certain examples, the method further includes providing a prompt for user action to correct positioning of the playback device with respect to the base.

In another aspect, a method is provided. The example method includes determining a position of a playback device with respect to a base; determining an orientation of the playback device; comparing the determined position to a reference position for the determined orientation; and, if the determined position corresponds to the reference position for the determined orientation, allowing operation of the playback device. However, if the determined position does not match the reference position for the determined orientation, the method includes limiting operation of the playback device.

In certain examples, the method further includes, if the determined position does not match the reference position for the determined orientation, generating a notification regarding an incorrect position. In certain examples, the notification includes at least one of a message, a visual indicator, and an audible indicator to a user indicating that the playback device is not properly positioned with respect to the base. In certain examples, the method further includes providing a prompt to correct positioning of the playback device with respect to the base. In certain examples, limiting operation further comprises limiting volume of output from the playback device. In certain examples, limiting operation further comprises adjusting an equalization setting of the playback device. In certain examples, determining the position includes determining, via a magnet sensor, a position of the base with respect to the playback device.

In another aspect, a base for a playback device is provided. The example base includes a surface arranged to support a playback device and a fastener to removably engage the playback device to the base. The example fastener is arranged with respect to the base to interact with a sensor in the playback device to determine a position of the base with respect to the playback device based on the interaction between the fastener and the base.

In certain examples, the surface of the base includes a first portion and a second portion, and the second portion is at least one of raised and angled with respect to the first portion. In certain examples, the base includes an indicator to display an indication of whether the base is properly positioned with respect to the playback device. In certain examples, the base includes a wireless access point to provide network connectivity to the playback device.

In another aspect, an example apparatus is provided. The example apparatus includes a playback device including a processor and a memory, the processor to process audio data for play back and a base to stabilize the playback device. In the example apparatus, at least one of the playback device and base includes a fastener to removably couple the base with respect to the playback device, and at least one of the playback device and the base includes a sensor to detect a position of the base with respect to the playback device. In the example apparatus, given an orientation of the playback device, the position of the base with respect to the playback device is compared to a reference position and generates a notification of incorrect position based on the comparison.

In certain examples, the processor limits operation of the playback device based on the notification of incorrect position. In certain examples, the processor limits operation of the playback device by limiting an output volume limit of the playback device. In certain examples, the processor generates a prompt for corrective action based on the notification of incorrect position. In certain examples, the playback device includes a plurality of fasteners and plurality of sensors to determine a side of the playback device on which the base is coupled.

In another aspect, an example interface is provided. An example non-transitory computer-readable storage medium including instructions stored thereon which, when executed by a processor, causes the processor to generate a graphical user interface on a controller device. The example graphical user interface is configured to receive an indication of improper positioning of a base with respect to a playback device; display a notification via the graphical user interface indicating the improper positioning; and generate a prompt to correct the improper positioning.

In certain examples, the notification includes an alphanumeric message. In certain examples, the notification further includes an image of a correct position of the base with respect to the playback device at a given orientation. In certain examples, the method further includes requesting confirmation when the position has been corrected.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A playback device comprising:
   a first fastener located on a first side of the playback device;
   a processor; and
   memory having stored thereon instructions executable by the processor to cause the playback device to perform functions comprising:
      determining that a base is not coupled to the playback device via the first fastener;
      in response to determining that the base is not coupled to the playback device via the first fastener, adjusting a playback setting of the playback device; and
      facilitating output of content via the playback device according to the adjusted playback setting.

2. The playback device of claim 1, wherein the instructions are further executable by the processor to perform functions comprising:
   identifying an orientation of the playback device, wherein adjusting the playback setting of the playback device occurs further in response to identifying the orientation of the playback device.

3. The playback device of claim 2, wherein the orientation is identified using an accelerometer.

4. The playback device of claim 1, wherein the instructions are further executable by the processor to perform functions comprising:
   determining that the playback device is mounted to a wall, wherein adjusting the playback setting of the playback device occurs further in response to determining that the playback device is mounted to the wall.

5. The playback device of claim 1, wherein adjusting the playback setting of the playback device comprises adjusting a volume level of the playback device.

6. The playback device of claim 1, wherein adjusting the playback setting of the playback device comprises limiting a maximum volume level of the playback device.

7. The playback device of claim 1, wherein adjusting the playback setting of the playback device comprises adjusting an equalization setting of the playback device.

8. The playback device of claim 1, wherein the fastener comprises a magnet.

9. The playback device of claim 7, wherein determining that the base is not coupled to the playback device via the first fastener comprises, determining, via a magnet sensor, that the base is not coupled to the playback device.

10. The playback device of claim 1, wherein the instructions are further executable by the processor to perform functions comprising:
   in response to determining that the playback device is not coupled to the base, causing an indication that the playback device is not coupled to the base to be provided.

11. The playback device of claim 10, wherein causing the indication to be provided further comprises causing the indication to be provided via at least one of the playback device, the base, and a controller of the playback device.

12. The playback device of claim 10, wherein the indication comprises a visual indication that the playback device is not properly positioned with respect to the base.

13. The playback device of claim 10, wherein the indication comprises an audible indication that the playback device is not properly positioned with respect to the base.

14. The playback device of claim 10, wherein the indication comprises a prompt to correct positioning of the playback device with respect to the base.

15. The playback device of claim 1, further comprising a second fastener located on a second side of the playback device and a third fastener located on a third side of the playback device.

16. A computer readable storage device including instructions stored thereon which, when executed by a processor, cause the processor to implement a method, the method including:
   determining that a base is not coupled to a playback device via the first fastener;
   in response to determining that the base is not coupled to the playback device via the first fastener, adjusting a playback setting of the playback device; and
   facilitating output of content via the playback device according to the adjusted playback setting.

17. The computer readable storage device of claim 16, further comprising identifying an orientation of the playback device, wherein adjusting the playback setting of the playback device occurs further in response to identifying the orientation of the playback device.

18. The computer readable storage device of claim 16, wherein adjusting the playback setting of the playback device comprises adjusting a volume level of the playback device.

19. The computer readable storage device of claim 16, wherein the method further comprises, in response to determining that the playback device is not coupled to the base, causing at least one of a message, a visual indicator, and an audible indicator to be provided indicating that the playback device is not properly positioned with respect to the base.

20. The computer readable storage device of claim 19, wherein the method further comprises providing a prompt to correct positioning of the playback device with respect to the base.

* * * * *